US010498692B2

(12) United States Patent
Karimli et al.

(10) Patent No.: US 10,498,692 B2
(45) Date of Patent: Dec. 3, 2019

(54) SELECTIVE CALL CONNECTION SYSTEM WITH IN-FLIGHT CONTROL

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 484 days.

(21) Appl. No.: 15/041,387

(22) Filed: Feb. 11, 2016

(65) Prior Publication Data

US 2017/0237702 A1   Aug. 17, 2017

(51) Int. Cl.
*H04L 29/12* (2006.01)
*H04L 12/58* (2006.01)
(Continued)

(52) U.S. Cl.
CPC .............. *H04L 61/10* (2013.01); *H04L 51/04* (2013.01); *H04L 51/043* (2013.01); *H04L 61/1547* (2013.01); *H04L 61/1588* (2013.01); *H04L 61/1594* (2013.01); *H04L 65/1016* (2013.01); *H04L 65/1073* (2013.01); *H04L 65/1096* (2013.01); *H04L 65/403* (2013.01); *H04L 67/12* (2013.01); *H04L 67/303* (2013.01);
(Continued)

(58) Field of Classification Search
CPC ....................................................... H04L 61/10
USPC ........................................................ 709/206
See application file for complete search history.

(56) References Cited

U.S. PATENT DOCUMENTS

| 5,659,596 A * | 8/1997 | Dunn ...................... H04W 4/12 455/456.1 |
| 7,548,756 B2 * | 6/2009 | Velthuis .................. H04L 51/04 455/414.1 |

(Continued)

FOREIGN PATENT DOCUMENTS

| EP | 2053782 A1 * | 4/2009 | ......... H04L 65/1063 |
| WO | WO03021900 A1 | 3/2003 | |

OTHER PUBLICATIONS

Microsoft Computer Dictionary, "presence technology", 5th edition, 2002, p. 418.*

(Continued)

*Primary Examiner* — Ondrej C Vostal
(74) *Attorney, Agent, or Firm* — Lee & Hayes, P.C.

(57) ABSTRACT

Systems and methods for selectively providing messages to users equipment (UEs) are disclosed. Different types of messages can be associated with different statuses for each UE based on user preferences, network settings, or plan parameters. UEs can be available to receive some types of messages, but not other types of messages, depending on the UE's current connection type, location, or plan parameters. Messages sent to multiple UEs associated with the same service account can be sent based on the availability of each UE to receive the message. Messages are not sent to UEs that are not available to receive that type of message. UEs connected to a common network can enable messaging services to other UEs associated with a common service account or network identity. Messaging services can be available despite each UEs availability to other types of messages.

15 Claims, 9 Drawing Sheets

(51) Int. Cl.
*H04L 29/06* (2006.01)
*H04L 29/08* (2006.01)
*H04W 8/12* (2009.01)
*H04W 84/04* (2009.01)

(52) U.S. Cl.
CPC ............ *H04L 67/327* (2013.01); *H04W 8/12* (2013.01); *H04W 84/042* (2013.01)

(56) References Cited

U.S. PATENT DOCUMENTS

| | | | | |
|---|---|---|---|---|
| 7,600,007 | B1* | 10/2009 | Lewis | G06Q 10/04 709/223 |
| 7,870,200 | B2* | 1/2011 | Slater | G06Q 10/107 702/187 |
| 8,001,176 | B2* | 8/2011 | Kemp | H04L 67/02 709/203 |
| 8,338,686 | B2* | 12/2012 | Mann | G06F 3/0481 84/609 |
| 8,644,818 | B1* | 2/2014 | Okmyanskiy | H04W 64/003 370/331 |
| 9,264,481 | B2* | 2/2016 | Walker | H04L 69/329 |
| 2002/0021307 | A1* | 2/2002 | Glenn | H04L 51/04 715/753 |
| 2002/0085701 | A1* | 7/2002 | Parsons | H04M 3/54 379/211.01 |
| 2003/0078985 | A1* | 4/2003 | Holbrook | H04L 29/06 709/213 |
| 2004/0064512 | A1* | 4/2004 | Arora | H04L 51/04 709/206 |
| 2004/0176074 | A1* | 9/2004 | Radpour | H04B 7/18506 455/414.1 |
| 2005/0113134 | A1* | 5/2005 | Bushnell | H04M 15/49 455/555 |
| 2005/0187781 | A1* | 8/2005 | Christensen | H04L 51/04 709/207 |
| 2006/0030311 | A1 | 2/2006 | Cruz et al. | |
| 2006/0052113 | A1* | 3/2006 | Ophir | H04W 8/02 455/456.1 |
| 2006/0149814 | A1* | 7/2006 | Borella | H04L 67/24 709/204 |
| 2007/0022161 | A1* | 1/2007 | Klug | H04L 51/04 709/206 |
| 2007/0041344 | A1* | 2/2007 | Yaqub | H04W 36/005 370/331 |
| 2007/0081658 | A1* | 4/2007 | Blohm | H04M 3/548 379/272 |
| 2007/0294397 | A1* | 12/2007 | Kunz | H04L 51/04 709/224 |
| 2008/0005238 | A1* | 1/2008 | Hall | G06Q 10/10 709/204 |
| 2008/0045176 | A1* | 2/2008 | Ho | H04L 29/06027 455/344 |
| 2008/0256192 | A1* | 10/2008 | Pinard | G06Q 30/02 709/206 |
| 2008/0294735 | A1* | 11/2008 | Muntermann | H04L 51/14 709/206 |
| 2009/0234922 | A1* | 9/2009 | Appelman | H04L 51/14 709/206 |
| 2009/0234927 | A1* | 9/2009 | Buzescu | H04L 67/24 709/206 |
| 2010/0029254 | A1* | 2/2010 | Libonati | G06Q 10/107 455/414.2 |
| 2010/0071053 | A1* | 3/2010 | Ansari | G06Q 30/04 726/12 |
| 2010/0174423 | A1* | 7/2010 | Pimouguet | G09B 9/003 701/3 |
| 2010/0318615 | A1* | 12/2010 | Griffin | G06Q 10/107 709/206 |
| 2011/0066688 | A1* | 3/2011 | Pinding | H04L 67/24 709/206 |
| 2011/0141974 | A1* | 6/2011 | Lieberman | H04L 51/38 370/328 |
| 2011/0194629 | A1* | 8/2011 | Bekanich | H04M 3/42382 375/259 |
| 2011/0231495 | A1* | 9/2011 | Westen | G06Q 10/107 709/206 |
| 2012/0028623 | A1* | 2/2012 | Verdon | G06Q 30/02 455/418 |
| 2012/0120800 | A1* | 5/2012 | Lientz | H04L 67/2814 370/235 |
| 2012/0166652 | A1* | 6/2012 | Bouthemy | H04L 65/1016 709/227 |
| 2012/0179767 | A1* | 7/2012 | Clarke | H04L 51/34 709/206 |
| 2014/0004832 | A1* | 1/2014 | Dabbiere | H04L 12/145 455/411 |
| 2014/0079057 | A1* | 3/2014 | Groves, Jr. | H04L 43/04 370/390 |
| 2014/0156833 | A1* | 6/2014 | Robinson | H04L 43/0817 709/224 |
| 2014/0254434 | A1* | 9/2014 | Jain | H04L 67/306 370/259 |
| 2014/0274086 | A1* | 9/2014 | Boerjesson | H04L 65/1006 455/450 |
| 2014/0310365 | A1* | 10/2014 | Sample | H04L 51/16 709/206 |
| 2014/0337590 | A1* | 11/2014 | Lemus | G06F 12/00 711/161 |
| 2015/0149087 | A1* | 5/2015 | Cohen | G06Q 10/109 701/522 |
| 2015/0332062 | A1* | 11/2015 | McReynolds | H04L 51/28 726/28 |
| 2015/0373515 | A1* | 12/2015 | Appelman | H04L 51/04 709/206 |
| 2016/0050177 | A1* | 2/2016 | Cue | G06F 16/273 709/206 |
| 2016/0359761 | A1* | 12/2016 | Sussman | G06Q 30/0283 |

OTHER PUBLICATIONS

PCT Seaqrch Report and Written Opinion dated May 19, 2017 for PCT application No. PCT/US2017/016921, 19 pages.

\* cited by examiner

SELECTIVE CALL CONNECTION SYSTEM WITH IN-FLIGHT CONTROL

BACKGROUND

Increasingly, users have multiple telecommunication devices that are used to engage in communication. In addition, family plans can enable a call to a single phone number to ring multiple devices, for example, in addition to messaging, shared minutes, and other shared features. The telecommunication devices may include cellular phones, tablet computers, laptops, and many other devices. Each device may have its own contact address, such as a phone number or mobile station international subscriber directory number (MSISDN), and may receive communications directed to any of the contact addresses associated with a service account.

One enabling technology for this service, call forking, may be implemented in a telecommunication network utilizing an Internet Protocol (IP) Multimedia Subsystem (IMS). In IMS, call forking may be achieved through implicit registration sets (IRS). With IRS, when any one network identity (e.g., IP Multimedia Public Identifier (IMPU)) associated with a contact address is registered, other network identities associated with the same service account as that network identity are also registered. Then, when a communication is received and directed to any one network identity of the registration set, it may be sent to all network identities of that registration set.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, a telecommunication system configured to determine a current location and/or status of one or more telecommunications devices, or user equipment (UE), and selectively deliver calls or messages to the one or more UEs based on availability. Each UE can receive a contact address associated with a network identity of a service account. The network identity may be received from an account information server, for example, or from a telecommunication device in SIP registration response message(s). The UEs can then provide periodic status updates to the system; or, in the alternative, the system can determine the status of the UEs based on their connections to the system, to other networks, or lack of connectivity, among other things. Messages, calls, and other data can then be selectively delivered to one or more UEs based on their current status.

In various implementations, the telecommunication network maintains a list of statuses for the one or more UEs. Upon receiving a message directed to a network identity, the telecommunication network can identify all contact addresses registered to the network identity. For each contact address, the telecommunication network device can determine whether the UE associated with the contact address is available. Based on those determinations, the telecommunication network device can deliver the message to the each of the UEs that are (1) associated with that network identity and (2) available. As discussed below, to avoid missed call, call rejection, and other errant notifications, the message is not sent to UEs that are determined to be unavailable.

An account information server, or other network components, may be configured to assign a contact addresses to each UE associated with a service account. Each UE associated with the service account may have a different status at the time a call or message is received. The system can route messages to certain UEs and not to other UEs based at least in part on their status. The current status of a UE may reflect the connectivity of the UE, the connection type, the location, or user preferences provided by a user associated with the service account.

Overview

Figure 1:
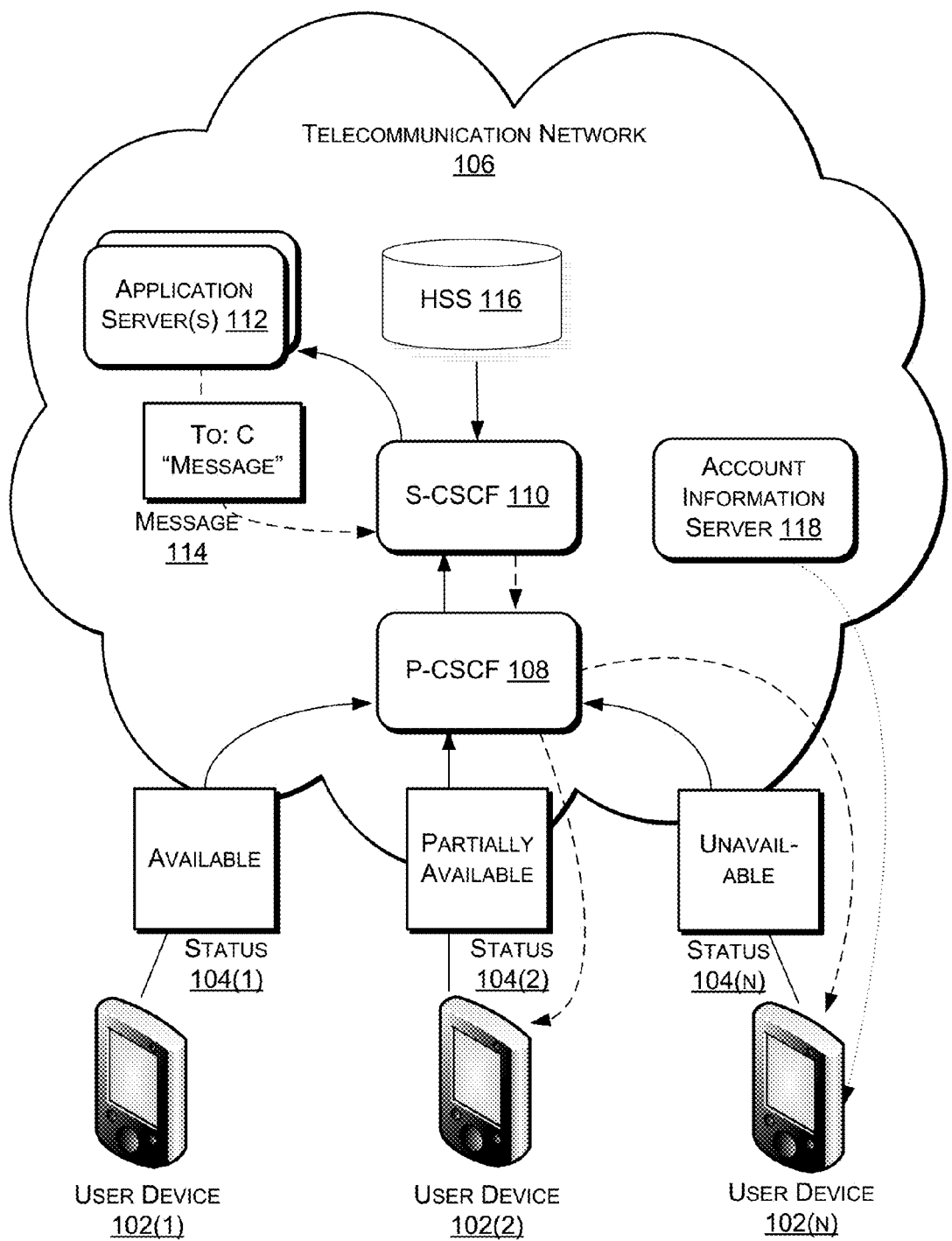
FIG. 1 illustrates an overview and example environment, including a system in which users equipment (UEs) provide status(es) to a telecommunication network and the telecommunication network delivers messages based on those statuses.

FIG. 1 illustrates an overview and example environment, including UEs 102 providing statuses, or the network determining statuses, for each contact address for each network identity. The environment also includes telecommunication network devices to deliver messages based on those statuses. As illustrated, UEs 102, such as UE 102(1), UE 102(2) and UE 102(n), provide statuses 104 such as available 104(1), partially available 104(2), and unavailable 104(N) to a telecommunication network 106. The statuses 104 may be periodically received by a telecommunication network device, such as a Proxy Call Session Control Function (P-CSCF) 108, a Serving Call Session Control Function (S-CSCF) 110, or one or more application servers 112. The P-CSCF 108, S-CSCF 110, or application server(s) 112 may utilize the statuses 104 when determining which UEs 102 to which to deliver a message 114. The telecommunication network 106 may also include either, or both, of a home subscriber server (HSS) 116 or an account information server 118, which may be configured to store and provide the network identities and/or contact addresses associated with a service account.

Figure 2:
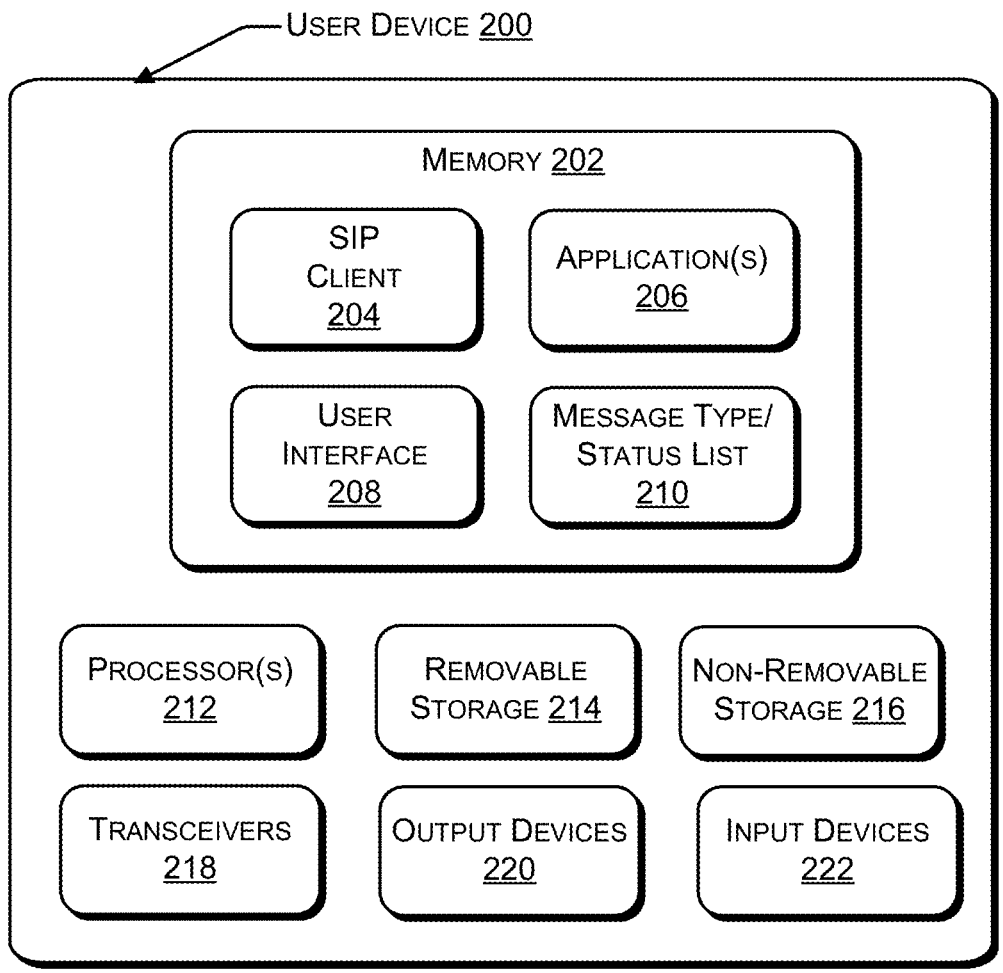
FIG. 2 illustrates a component level view of UEs for use with the system.

In various implementations, the UEs 102 may be any sort of computing device or computing devices, such as cellular phones, tablet computers, laptop computers, wearable computers, media players, personal computers (PCs), workstations, or any other sort of device or devices. Different UEs 102 may be different types of UEs 102. For example, UE 102(1) may be a cellular phone (e.g., a smart phone), UE 102(2) may be a tablet computer, and UE 102(n) may be a laptop computer. Each UE 102 may be configured with a Session Initiation Protocol (SIP) client configured to communicate with an Internet Protocol (IP) Multimedia Subsystem (IMS) of the telecommunication network 106. The UEs 102 may also each be associated with a single service account (e.g., on a family or work plan). UE 102(1) may be a cellular phone associated with a telecommunication service account, for example, and UE 102(n) may be a laptop computer logged into that service account through a website, downloaded client, or other suitable means. An example UE 102 is shown in FIG. 2 and described in greater detail below.

In further implementations, the telecommunication network 106 may be any sort of telecommunication network or networks associated with a telecommunication service provider. Such a telecommunication network 106 may include a core network and multiple access networks associated with multiple locations. The access networks may include cellular networks—utilizing Long Term Evolution (LTE), Global System for Mobility (GSM), or other cellular technology—and other networks (e.g., WiFi) utilizing unlicensed spectrum. The access networks can also include airborne WiFi and cellular networks such as, for example, Gogo in-flight services.

The core network may support packet-switched or circuit-switched connections and may include a number of network components. Such components may include a home location register (HLR) or HSS 116 for storing user and device information, as well as IMS components, such as P-CSCF 108 and S-CSCF 110. The components may also include application server(s) 112, such as a telephony application server (TAS) or rich communication service (RCS) server. Further, the telecommunication network 106 may include an account information server 118, which may provide network identities, contact addresses, credentials, and other information to the UE 102.

Figure 3:
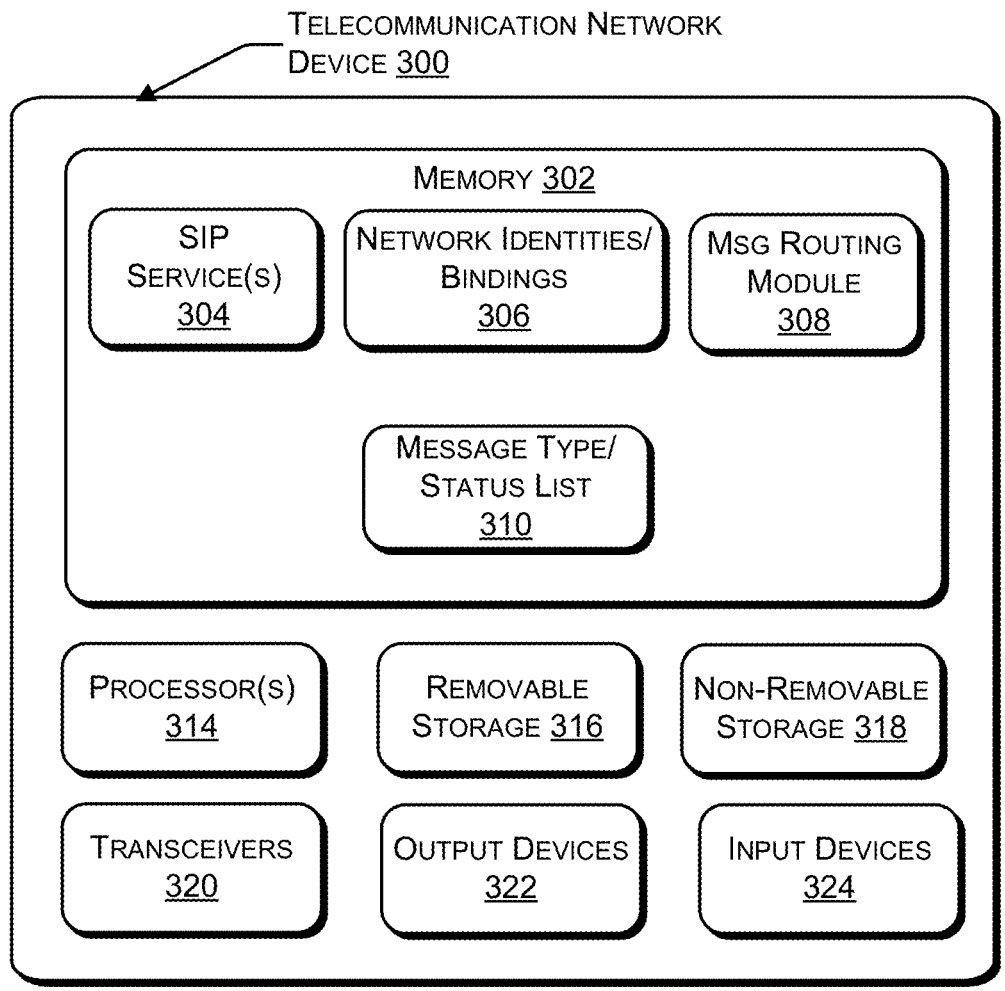
FIG. 3 illustrates a component level view of a telecommunication network device configured to deliver messages to UE(s) based on the status(s) of those UEs.
Figure 4:
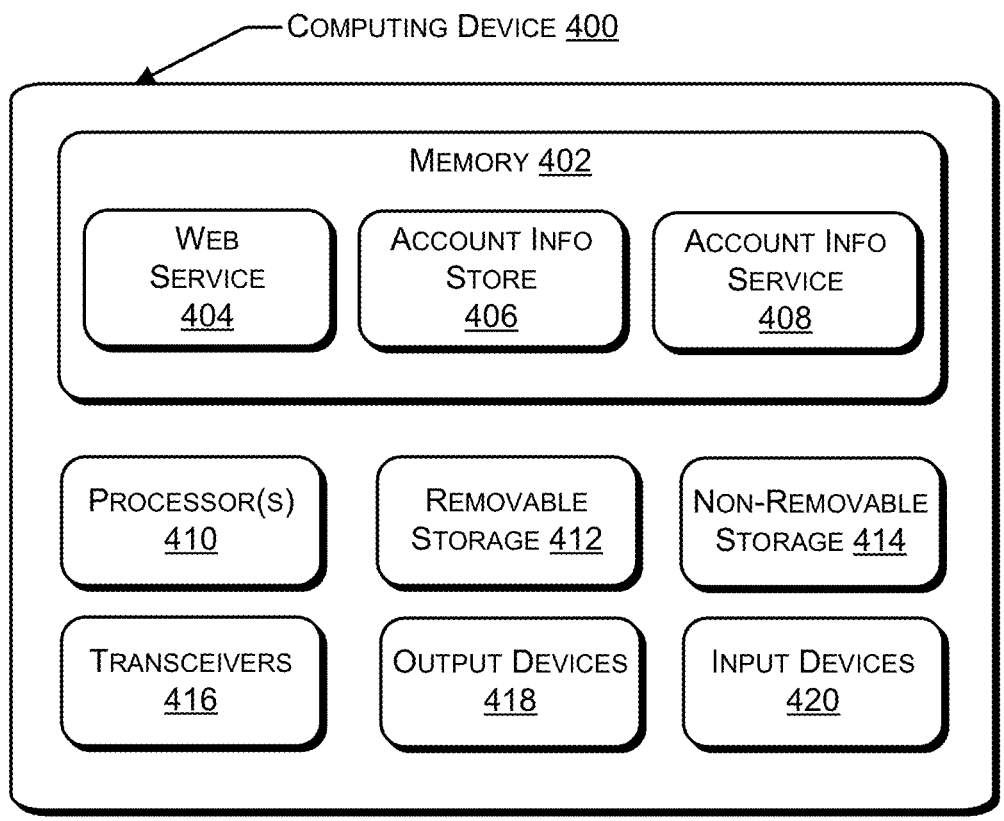
FIG. 4 illustrates a component level view of a computing device configured to store and provide account information, such as an account information server, including indications of network identities and/or contact address(es) associated with a UE and a service account.

Any of the telecommunication network devices, such as the P-CSCF 108, S-CSCF 110, application server(s) 112, HSS 116, or account information server 118, may be implemented on one or more computing devices. Alternatively or additionally, the telecommunication network devices, such as the P-CSCF 108 and S-CSCF 110 may be implemented on a single computing device. Such computing devices may each be or include a server or server farm, multiple, distributed server farms, a mainframe, a work station, a PC, a laptop computer, a tablet computer, an embedded system, or any other sort of device or devices. In one implementation, the computing device(s) represent a plurality of computing devices working in communication, such as a cloud-computing network of nodes. An example telecommunication network device 300—which could be used to implement the P-CSCF 108, S-CSCF 110, or application server 112—is illustrated in FIG. 3 and is described in detail below with reference to that figure. An example account information server 112 is illustrated in FIG. 4 and is described in detail below with reference to that figure.

In various implementations, UEs 102 may receive network identities from the telecommunication network 106, as an implicit registration set (IRS), or from the account information server 118 as an IRS. The network identities may be IP Multimedia Public Identifiers (IMPUs) or other user identities and may be associated with one or more contact addresses. The contact addresses can comprise one or more network identifiers such as, for example, a mobile station international subscriber directory number (MSISDN) associated with a particular UE 102. Such a contact address may be associated with multiple network identities. Conversely, multiple contact addresses can be associated with a single network identity (e.g., multiple UEs 102 can ring at the same time when a single phone number is dialed).

The network identities and contact addresses may also be associated with a service account, such as a personal or business account for services offered by the telecommunications and/or internet service provider operating the telecommunication network 106. Each service account may be associated with multiple users via multiple contact addresses, multiple network identities, and/or multiple UEs 102. For example, each of UE 102(1), UE 102(2), and UE 102(n) may be associated with a single service account. UE 102(1) may be a cellular phone with a subscriber identity module (SIM) associated with the telecommunication service provider. UE 102(N), on the other hand, may be a laptop computer with a separate SIM, an application downloaded from the telecommunication service provider, or logged in to the telecommunication service provider via an internet or cellular connection.

The UEs 102 may receive the IRS from the telecommunication network 106, for example, responsive to sending SIP registration message(s) to the telecommunication network 106. The IRS may then be provided to the UEs 102 in SIP registration response message(s), such as 2000K message(s), in message headers (e.g., P-associated Uniform Resource Identifier (URI) headers). The IRS may be retrieved from the HSS 116 by the S-CSCF 110 and provided to the UEs 102 through the P-CSCF 108. The S-CSCF 110 may retrieve the IRS responsive to receiving the SIP registration message(s).

Additionally or alternatively, the IRS may be stored on the account information server 118 and provided to the UEs 102. If multiple UEs 102 are associated with the account, the account information server 118 may provide different IRSs to each of the associated UEs 102. The IRS may be received by the UEs 102 from the account information server 118 at any time, even prior to the initiation of any communication session with the IMS of the telecommunication network 106.

The account information server 118 may receive and store one or more contact addresses responsive to manual status updates received from a user. For example, through a user interface, such as a website, the account information server 118, or other device of the telecommunication network 106, may enable a user to select the contact addresses he or she wishes to receive on each UE 102. In some implementations, the user may specify network services, message types, usage limits, or other parameters that are desired for a given contact address.

For instance, a user may wish to receive all communications to a particular network identity on UE 102(1), but may only wish to receive voice calls to that same network identity on UE 102(2). Thus, the user may specify (1) desired contact addresses and/or desired network services (e.g., a "whitelist") and/or (2) contact addresses or network services that the user does not wish to receive on a given UE 102 (e.g., a "blacklist"). These network services may be identified using feature tags or IMS communication service identifiers (ICSIs). Based on the user input, the account information server 118 may receive mappings of contact addresses to UEs 102. In some implementations, the mappings may be of one or more network identities associated with each contact address to UEs 102. The account information server 118 may then or later provide to each UE 102 the contact addresses or network identities selected for it. If the user specifies network services for a contact address, the account information server 118 may also store and provide identifications of those network services to the UE 102.

In some cases, once a UE 102 has received an IRS, the UE 102 may set a status 104 (e.g., available, partially available, or unavailable) of that IRS based on user preferences. Those user preferences may in turn be generated based on user input received through a user interface, such as a user interface of a platform component or application of the UE 102. As described above with reference to the account information server 118, the user may indicate via the user interface the contact addresses that the user wishes to use on that UE 102. The user may also indicate which network services for a given contact address that the user wishes to receive. The user may also provide under what circumstances, or statuses, the user wishes to receive each service (e.g., each type of message). Such user preferences may then be stored for future use. As such, these preferences can be generated in advance of receiving the IRS, though this is not required.

The SIP client of the UE 102 may then provide the status 104 to the telecommunication network in private header(s) of SIP message(s), such as SIP registration message(s) or SIP re-registration message(s). When the IRS is received in SIP registration response message(s), the status 104 may be provided in SIP re-registration message(s). When the IRS or the status 104 is received from an account information server 118, the status 104 may also be provided in SIP registration message(s).

In some implementations, as discussed below, the UEs 102 may also update their respective statuses 104 based on their current location, connection type, or other factor. In other words, if a UE 102 is connected to a home cellular network and/or WiFi, the UE 102 may be available for all types of messages. If, on the other hand, the UE 102 is connected to a roaming cellular network or an in-flight WiFi connection, for example, the UE 102 may be partially available or unavailable. In other words, the UE 102 may be available to receive certain types of messages (e.g., text messages), but not receive other types of messages (e.g., voice calls or IMs).

The status 104 for each UE 102 is then received by a P-CSCF 108 of the telecommunication network 106 and may be stored locally in cache of the P-CSCF 108 in association with contact addresses used to identify the respective UEs 102 and updated periodically. Alternatively or additionally, the status 104 may be provided to the S-CSCF 110 and stored locally in cache of the S-CSCF 110 in associated with contact addresses used to identify respective UEs 102. The contact addresses utilized by the S-CSCF 110 may differ in some implementations from those used by the P-CSCF 108.

In addition, the statuses 104 may be provided to application server(s) 112 and stored locally in cache of the application server(s) 112 in association with contact addresses used to identify the respective UEs 102. The contact addresses utilized by the application server(s) 112 may, in some implementations, differ from those used by the P-CSCF 108, the S-CSCF 110, or both. When provided to the application server(s) 112, the SIP message(s) including the statuses 104 may be provided as attachments to third party registration (TPR) messages sent from the S-CSCF 110 to the application server(s) 112.

In some implementations, TPR messages may or may not include an embedded registration element from the P-SCSF 108 based on the inclusion of a status 104 in a registration message. For a given contact address, if the status 104 changes due to a refresh registration from a UE 102 associated with that contact address, the S-CSCF 110 may perform a de-register or register with using new TPR message(s) with the application server(s) 112. This can enable the UE 102, or the telecommunication network 106, to update the status of each UE 102 as they move from place to place, network to network, or user preferences change.

In various implementations, the statuses 104 may then be utilized when routing a message 114 to any or all of the UEs 102. Upon receiving a message 114, directed to a network identity associated with a service account, the device storing the statuses 104 (e.g., the P-CSCF 108, the S-CSCF 110, or the application server(s) 112) may identify one or more contact addresses registered against any of the network identities associated with that service account. For each contact address, the device may then determine which UEs 102 associated with the network identity specified by the message 114 should receive the message 114. The device may then, based on that determination, deliver the message 114 to the UEs 102 that are (1) included that network identity and (2) have the proper status 104 for the message 114.

In FIG. 1, the message 114 may be a text message, for example, directed to a network identity "C." Based on network 106 or user settings, text messages may be deliverable to UEs 102 that have a status 104 of available or partially available. Because the status 104(1) and the status 104(2) specify available and partially available, respectively, the message 114 may be delivered to UE 102(1) and UE 102(2). Because UE 102(N) is unavailable, the message 114 is not delivered to UE 102(N). If the message 114 is a voice call, on the other hand, the message 114 may only be delivered to UE 102 104(1)—assuming that the settings dictate that only UEs 102 that are available receive voice calls.

Example Devices

FIG. 2 illustrates a component level view of an example UE 102 configured to be identified with a network identities and to provide a status to the system. As illustrated, the UE 102 comprises a system memory 202 storing a SIP client 204, application(s) 206, a user interface 208, and a message type/status list 210. Also, the UE 102 includes processor(s) 212, a removable storage 214, a non-removable storage 216, transceivers 218, output device(s) 220, and input device(s) 222.

In various implementations, system memory 202 is volatile (such as RAM), non-volatile (such as ROM, flash memory, etc.) or some combination of the two. The SIP client 204 may perform any or all of the receiving of network identities, contact addresses, determining status 104, or providing status 104, as described above. The application(s) 206 or user interface 208 may be utilized to receive user input and generate user preferences, which may then be used by the SIP client 204 to generate a status 104 and/or to populate the message type/status list 210. Alternatively, the application(s) 206 may also utilize the user preferences to select the status 104.

As the name implies, the message type/status list 210 can comprise a list of message types. The message types can include, for example, voice calls, SMS (text) messages, video calling, picture message, or instant messages (IM). The status list can correlate a status—e.g., available and unavailable—with a message type. As shown in Table 1, the statuses and message types can vary by the type of UE 102, user preferences, network preferences, and other factors.

TABLE 1

Status vs. Message Type

| UE 102 | Status | Message Types Received | Message Types Not Received |
| --- | --- | --- | --- |
| UE 102(1) | Available | All | None |
|  | Partially Available | Text, IM | Voice Call |
|  | Unavailable | None | All |
| UE 102(2) | Available | All | None |
|  | Partially Available | Text | Voice Call, IM |
|  | Unavailable | None | All |
| UE 102(1) | Available | All | None |
|  | Partially Available | None | All |
|  | Unavailable | None | All |

The differences between the UEs 102 can be based on the UEs 102 themselves (e.g., technical barriers), user preferences, rate plans, carrier, etc. In some examples, in addition to (fully) available and (fully) unavailable, some systems or UEs 102 may also have a "partially available" status in which the UE 102 can receive some types of messages, but not others. Partially available can be used to denote a UE 102 that has a WiFi connection, for example, but no cellular connection (or vice-versa). Partially available could also be used to denote a UE 102 that is roaming or in a particular location (e.g., on a plane), or on a particular type of network (e.g., 3G vs. 4G).

In some implementations, the processor(s) 212 is a central processing unit (CPU), a graphics processing unit (GPU), or both CPU and GPU, or any other sort of processing unit. The UE 102 may also include additional data storage devices (removable and/or non-removable) such as, for example, magnetic disks, optical disks, or tape. Such additional storage is illustrated in FIG. 2 by removable storage 214 and non-removable storage 216.

Non-transitory computer-readable media may include volatile and nonvolatile, removable and non-removable tangible, physical media implemented in technology for storage of information, such as computer readable instructions, data structures, program modules, or other data. System memory 202, removable storage 214 and non-removable storage 216 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the UE 102. Any such non-transitory computer-readable media may be part of the UE 102.

In some implementations, the transceivers 218 include any sort of transceivers known in the art. For example, transceivers 218 may include a radio transceiver that performs the function of transmitting and receiving radio frequency communications via an antenna. The transceivers 218 may facilitate wireless connectivity between the UE 102 and other devices. In addition, the transceivers 218 may also include a wireless communication transceiver and a near field antenna for communicating over unlicensed wireless IP networks, such as local wireless data networks and personal area networks (e.g., Bluetooth or near field communication (NFC) networks). Further, the transceivers 218 may include wired communication components, such as an Ethernet port, that connect the UE 102 in a wired fashion to other devices.

In some implementations, the output devices 220 include any sort of output devices known in the art, such as a display (e.g., a liquid crystal display), speakers, a vibrating mechanism, or a tactile feedback mechanism. Output devices 220 also include ports for one or more peripheral devices, such as headphones, peripheral speakers, or a peripheral display.

In various implementations, input devices 222 include any sort of input devices known in the art. For example, input devices 222 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 3 illustrates a component level view of a telecommunication network device configured to deliver messages to UE(s) 102 based on status(es) of the UE(s) 102. The telecommunication network device 300 may be an example of a P-CSCF 108, the S-CSCF 110, or an application server 112, or other network device. As illustrated, the telecommunication network device 300 comprises a system memory 302 storing SIP service(s) 304, network identities/bindings 306, and a message routing module 308. Further, the memory 302 may include a message type/status list 312. Also, the computing device 300 includes processor(s) 314, a removable storage 316, a non-removable storage 318, transceivers 320, output device(s) 322, and input device(s) 324.

In various implementations, system memory 302 is volatile (such as RAM), non-volatile (such as ROM, flash memory, etc.) or some combination of the two. SIP service(s) 304 may perform any of the SIP functions of the telecommunication network device 106, including retrieving the network identities and/or contact addresses from the HSS 116 or similar, including, e.g., Sh/Cx interfaces, and providing the network identities and/or contact addresses to the UEs 102. The network identities/bindings 306 may be used by the message routing module 308 to identify contact addresses, as described above. The message routing module 308 may also store statuses 104, which may be updated in real-time or periodically, receive messages, identify contact addresses, determine whether any UEs 102 associate with the network identity addressed by a received message have an appropriate status, and deliver the message based on that determination.

The message routing module 308 can maintain and/or determine the status of each UE 102 associated with the message upon receiving a message. The message routing module can then compare each UE 102 to the message type-status list 310 to determine if the message can be delivered to any of the UEs 102 associated with the network identity provided in the message. The message type/status list 310 can provide the types of messages that can be delivered to each UE 102 based on their status. As discussed above, the message type/status list 310 can be stored on the network device 300, on the UE 102, or both.

In some implementations, the processor(s) 314 is a central processing unit (CPU), a graphics processing unit (GPU), or both CPU and GPU, or any other sort of processing unit. The telecommunication network device 300 may also include additional data storage devices (removable and/or non-removable) such as, for example, magnetic disks, optical disks, or tape. Such additional storage is illustrated in FIG. 3 by removable storage 316 and non-removable storage 318.

Non-transitory computer-readable media may include volatile and nonvolatile, removable and non-removable tangible, physical media implemented in technology for storage of information, such as computer readable instructions, data structures, program modules, or other data. System memory 302, removable storage 316 and non-removable storage 318 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the telecommunication network device 300. Any such non-transitory computer-readable media may be part of the telecommunication network device 300.

In some implementations, the transceivers 320 include any sort of transceivers known in the art. For example, the transceivers 320 may include wired communication components, such as an Ethernet port, for communicating with other networked devices. Also or instead, the transceivers 320 may include wireless modem(s) to may facilitate wireless connectivity with other computing devices. Further, the transceivers 320 may include a radio transceiver that performs the function of transmitting and receiving radio frequency communications via an antenna.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 4 illustrates a component level view of a computing device configured to store and provide account information, including indications of contact address(es) associated with a network identity and the UEs 102 associated therewith. The account information server 118 may be an example of such a computing device. As illustrated, the computing device 400 comprises a system memory 402 storing a web service 404, an account information store 406, and an account information service 408. Also, the computing device 400 includes processor(s) 410, a removable storage 412, a non-removable storage 414, transceivers 416, output device(s) 418, and input device(s) 420.

In various implementations, system memory 402 is volatile (such as RAM), non-volatile (such as ROM, flash memory, etc.) or some combination of the two. The web service 404 may be utilized to provide a user interface to a user and receive user input indicating user preferences mapping contact addresses to UEs 102. The account information store 406 may store the mappings, as well as other information utilized by a UE 102 to access services of the telecommunication network 106. The account information service 408 may provide the contact addresses (or network identities) to each UE 102 that are mapped to that UE 102.

In some implementations, the processor(s) 410 is a central processing unit (CPU), a graphics processing unit (GPU), or both CPU and GPU, or any other sort of processing unit. The computing device 400 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. System memory 402, removable storage 412 and non-removable storage 414 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 400. Any such non-transitory computer-readable media may be part of the computing device 400.

In some implementations, the transceivers 416 include any sort of transceivers known in the art. For example, the transceivers 416 may include wired communication components, such as an Ethernet port, for communicating with other networked devices. Also or instead, the transceivers 416 may include wireless modem(s) to may facilitate wireless connectivity with other computing devices. Further, the transceivers 416 may include a radio transceiver that performs the function of transmitting and receiving radio frequency communications via an antenna.

In some implementations, the output devices 418 include any sort of output devices known in the art, such as a display (e.g., a liquid crystal display), speakers, a vibrating mechanism, or a tactile feedback mechanism. Output devices 418 also include ports for one or more peripheral devices, such as headphones, peripheral speakers, or a peripheral display.

In various implementations, input devices 420 include any sort of input devices. For example, input devices 420 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
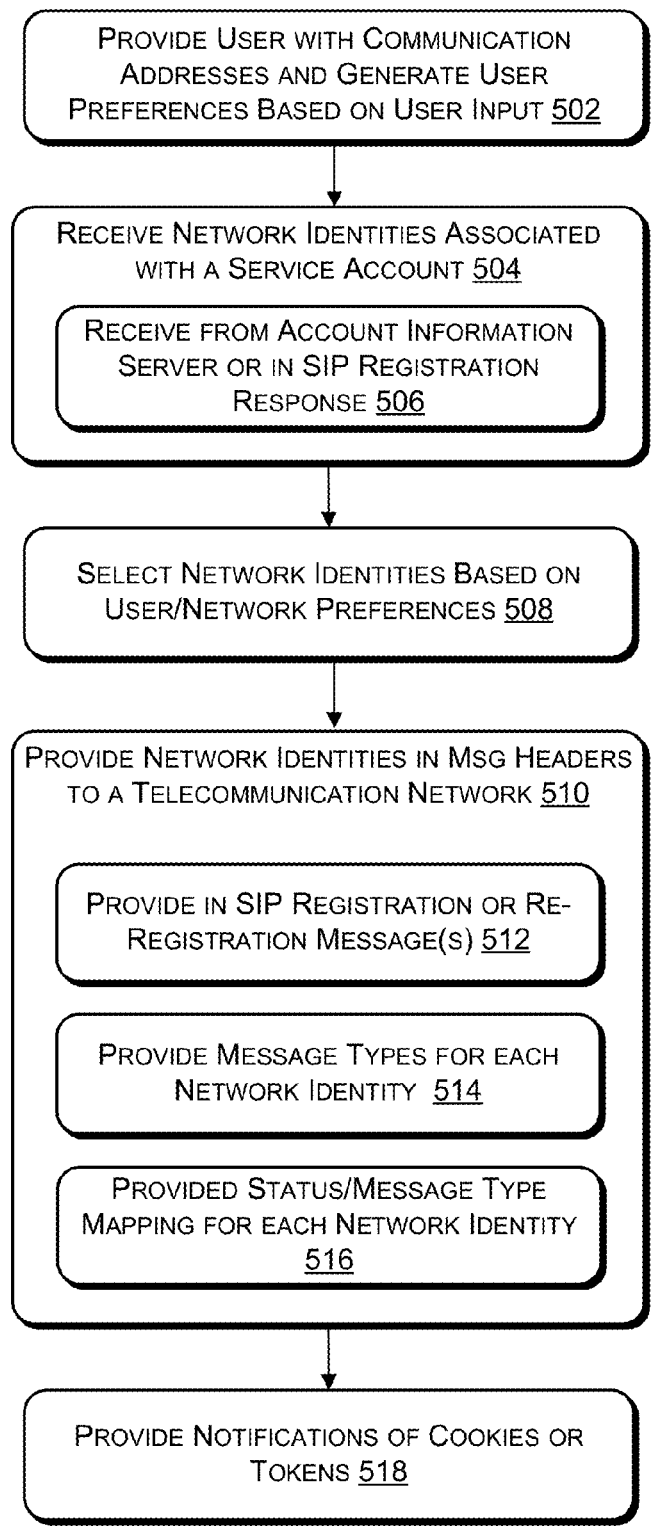
FIG. 5 illustrates an example process for selecting network identities and providing message type/status mapping for a service account associated with a UE 102 based on various personal or network preferences associated with that UE.
Figure 6:
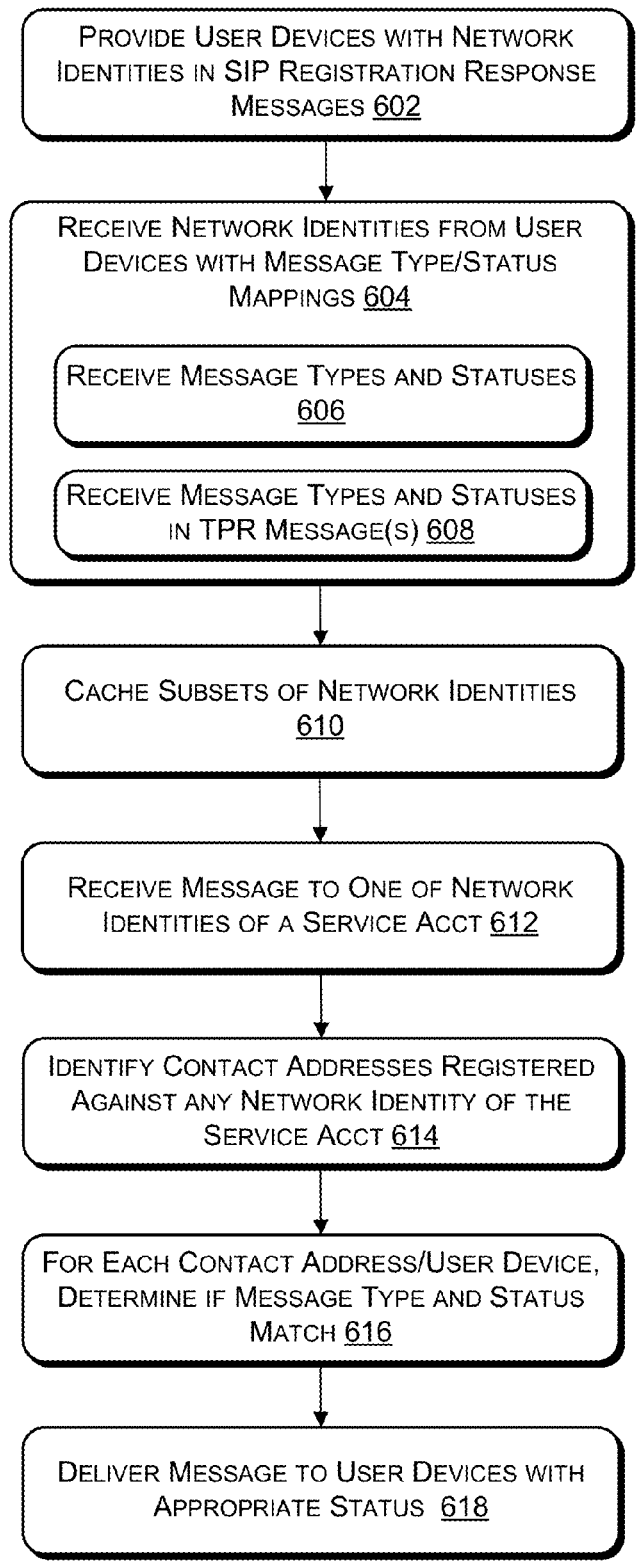
FIG. 6 illustrates an example process for receiving parameters for network identities and delivering messages to UE(s) of a service account based on the message type received and the status of those UE(s) in light of the received parameters.
Figure 7:
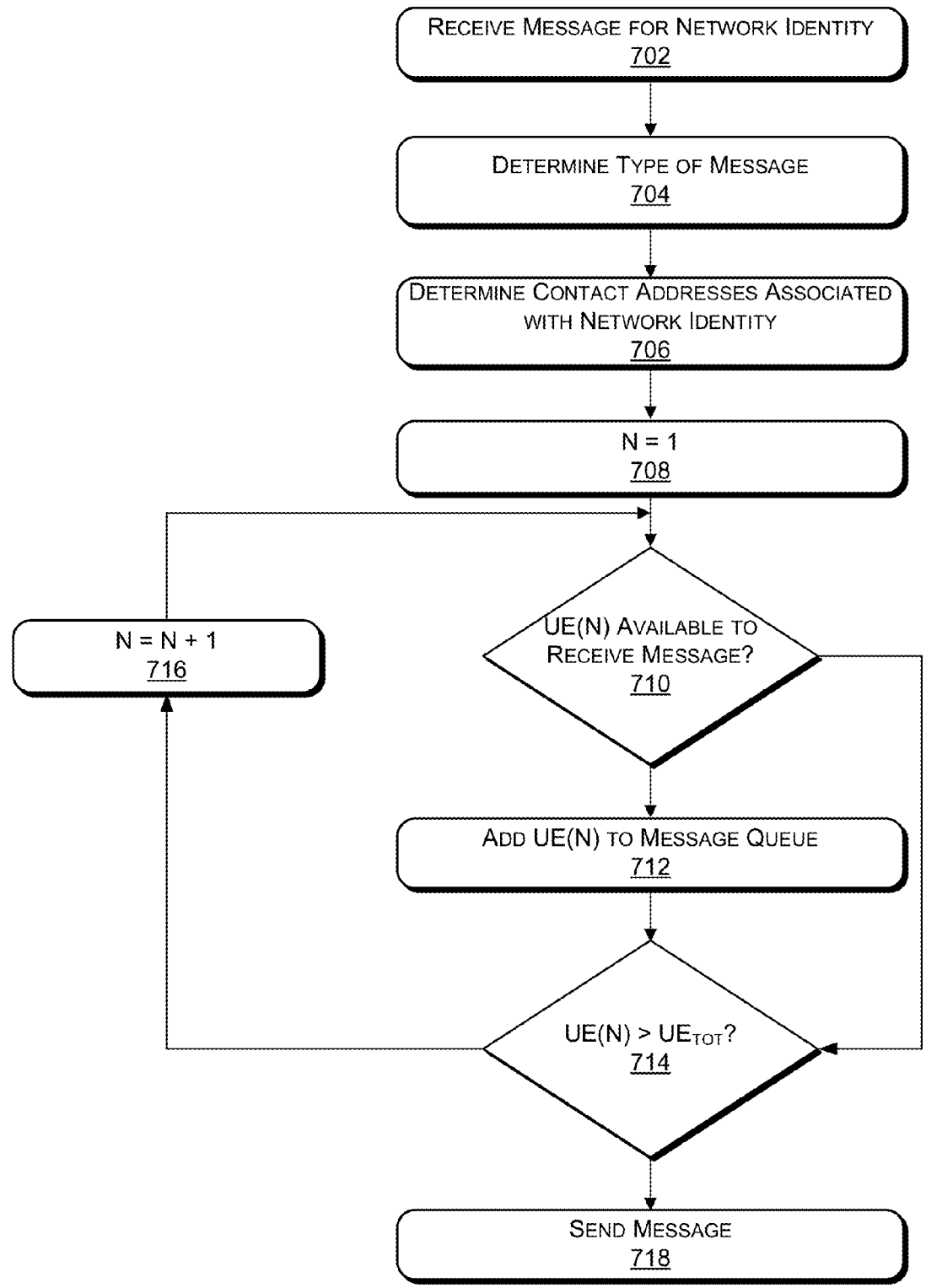
FIG. 7 illustrates an example process for receiving messages for a service account or network identity, determining the type of the message, and then determining which contact addresses associated with the service account are available to receive the message.

FIGS. 5-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for providing network identities associated with a service account for a UE 102 based on parameters associated with that UE 102. Some or all of the operations shown in FIG. 5 may be performed by a SIP client of a UE 102. The process includes, at 502, providing, by the UE 102, a user with a set of contact addresses for which the UE 102 may receive communications and generating user preferences based on user selection of one or more of the contact addresses.

At 504, the UE 102 may receive identifications of multiple network identities associated with the service account, the multiple network identities can, in turn, be associated with a plurality of different UEs 102. At 506, the UE 102 may also receive the network identities from an account information server or from a telecommunication network device in a SIP registration response message. Such a SIP registration response may provide the identifications in a P-associated Uniform Resource Identifier (URI) header. The SIP registration may also include various network and/or carrier settings.

At 508, the UE 102 may select one or more of the multiple network identities based on the user preferences. The preferences indicate network identities for which a user wishes the UE 102 to receive communications. These network identities may be associated with the contact addresses selected at 502. The UE 102 may also select various other setting for each network identity, including carrier or network settings, related to message types and UE 102 statuses.

At 510, the UE 102 may provide the selected network identities in one or more headers of messages to a telecommunication network. The one or more headers may be one or more private headers. At 512, the UE 102 may provide the selected network identities in SIP registration or SIP re-registration message(s). The network identities may be included in SIP registration message(s), for example, if the network identities were received from an account information server (at 506). The network identities may be included in SIP re-registration message(s), for example, if the network identities were received in SIP registration response message(s) (at 506). At 514, the UE 102 can also provide a list of message types. Identifying the message types may include specifying network services to be received at the UE 102 for each network identity and/or message types to be received (or not to be received) at the UE 102 for the network identity. At 516, the UE 102 may also provide a list of statuses and the associated message type(s) for each status. In other words, some statuses may receive all types of messages, while others may receive only some types or no messages at all. In some examples, as discussed above, no message types may be associated with a particular status (e.g., unavailable). At 518, the UE 102 may provide notifications of cookies or tokens as required by network or internet protocols.

FIG. 6 illustrates an example process for delivering messages to UE(s) 102 associated with a service account based on the status of the UE 102 and the message type received. The process includes, at 602, providing, by a telecommunication network device (e.g., an HSS, HLR, or account information server), UEs 102 associated with a service account with network identities and/or contact addresses associated with that service account in an SIP registration response message.

At 604, a telecommunication network device (e.g., P-CSCF 108, S-CSCF 110, or an application server 112) may receive the network identities from the respective UEs 102. The network identities may be provided through SIP registration or SIP re-registration messages. At 606, the UEs 102 may also provide a current status and/or a message type list. At 608, when the telecommunication network device is an application server 112, the statuses of the UEs 102 may be received through TPR messages that include attachments comprising the statuses in SIP registration or SIP re-registration messages.

At 610, the telecommunication network device may cache the statuses of UEs 102 associated with network identities in memory for a time period associated with a SIP communication session. The statuses may be updated periodically or constantly. The statuses may also be updated each time a message is received.

At 612, the telecommunication network device may receive a message directed to one of the network identities associated with the service account. At 614, the telecommunication network device may identify one or more contact addresses registered to a service account, or any of the plurality of network identities, provided in the message. Each of the one or more contact addresses may be associated with at least one of the UEs 102.

At 616, the telecommunication network device may, for each contact address, determine the status of the UE 102 associated with that contact address. As mentioned above, each UE 102 may be available, partially available, or unavailable. The status of the UE 102 may change based on user preferences, location, connection type, network, or other factors. Based on the status and the message type received (at 608), the system can make a determination about whether to deliver the message to a particular UE 102 or not.

At 618, the telecommunication network device may deliver, based on the status of each UE 102 (determined at 616), the message to the UEs 102 associated with the network identity and that have the appropriate status based on the mapping determined at 604. The message may be a voice call, for example, with a first UE 102 associated with the network identity available and a second UE 102 unavailable. In this case, the system can deliver the message the first UE 102, but not send the message to the second UE 102.

As mentioned above, a single network identity can be mapped to multiple UEs 102. This can be part of a "family plan," for example, where each family member has a phone that rings in response to a single number being dialed. In some cases, however, the telecommunications system can determine that one or more of the UEs 102 are not available to receive a call or a message based on a location, IP address, or other data from the UE 102. If one of the UEs 102 is connected to an in-flight internet service such as Gogo, for example, then it may be desirable to route text messages or IMs to that UE 102, but not voice calls. The status can be provided by the UE 102, for example, or can be determined based cookies, cell tower information, location services, or the current IP address of the UE 102. If the current IP address of the UE 102 is associated with the server of an in-flight internet service, for example, the appropriate status can be assigned to the UE 102.

For ease of explanation, the generic term "message" is used below to denote any communication to a UE 102. The message can comprise a message or call for which a UE 102 is available under certain conditions, but not available under other conditions. As a result, a message can include a voicemail, text message, voice call, IM, or other data.

As shown in FIG. 7, examples of the present disclosure can also comprise a method 700 for routing messages only to appropriate UEs 102. In other words, if a voice call comes in that is directed to four UEs 102 associated with a single network identity, for example, the system can determine that some of the UEs 102 are available for a voice call and others are not. The system can then route the voice call only to the available UEs 102. This can avoid issues with calls being rejected by another first user before a user can answer the call. If a user on an airplane accidentally receives a call in flight, for example, the user may instinctively ignore the call. Unfortunately, this may cause the call to show as a "missed call" on all UEs 102, for example, rather than allowing a UE 102 on the ground to answer, or the call to go to voicemail, as appropriate.

At 702, a message can be received for a particular network identity by the telecommunications network. As discussed above, the message can be received by a number of network components (e.g., by the P-CSCF 108, S-CSCF 110, or application server(s) 112) for handling and routing through the network. The message can include the network identity and/or the service account associated with the recipient(s) of the message.

At 702, the system can determine the type of message received. As discussed above, in some cases, a UE 102 may be available to receive a first type of message, but not a second type of message. If a UE 102 is on a plane or roaming, for example, then the UE 102 may be available to receive a short messaging system (SMS, or text) message or an instant message (IM), but not a voice call. Availability, therefore, can be a function of both whether the UE 102 is connected to the network and how the UE 102 is connected to the network. The availability may be provided by the UE 102, or may be determined by the system based on information provided by the UE 102, the UEs 102 IP address, cell tower address, location, or other information.

In addition, users with common network identities may nonetheless have separate voice and data plans. The plans may differ between parents and children, for example, or between different levels of employees (e.g., vice-president vs. store manager). In some examples, therefore, the availability of the UE 102 can also be set by the user or automatically based on plan limits or other factors. In other words, if the user has voice minutes remaining, for example, but has used the allotment of text messages, then the user can set his availability accordingly. In this case, the user may set the UE 102 to be available for voice calls and unavailable for text messages.

At 706, the system can determine the contact addresses associated with the network identity and/or the service account associated. The network identity can be associated with each applicable UE 102, for example, via one or more contact addresses (e.g., one or more MSISDNs) assigned to each UE 102. For a family of four on a family plan, the network identity can be associated with four contact addresses, for example, each contact address associated with a UE 102 of a family member.

At 708, the system can determine the message type. As mentioned above, in some instances, the availability of the UE 102 can be dependent on the type of message. In other words, based on connection type, location, and/or other factors, the UE 102 may be available to receive one type of message but not another. The UE 102 may be able to receive text messages, for example, but not IMs (or vice-versa).

At 710, the system can assign an iteration number to ensure that the availability of each UE 102 is determined prior to sending the message. At 712, the availability of the first UE 102, UE 102(1), can be determined. As discussed above, the P-CSCF 108, S-CSCF 110, or application server(s) 112 may utilize the statuses 104 of each UE 102 when determining which UEs 102 to deliver the message 114. In some examples, the status of the UE 102 can be determined in real-time, for example, by "pinging" the cell phone. In some examples, the availability of the UE 102 may depend on the type of message, as determined at 708. In other words, the UE 102 may be available to receive text messages, but not voice calls.

At 714, if the UE 102(1) is determined to be available for a particular message, then UE 102(1) is added to a queue to receive the message. Thus, if UE 102(1) is determined to be available (e.g., on the ground and connected to a cellular network), then a voice call can be routed to UE 102(1). If, on the other hand UE 102(1) is determined to be unavailable (e.g., UE 102(1) is not connected or is connected to an in-flight network), UE 102(1) is not added to the queue. In this examples, the message may be a voice call and UE 102(1) may be on a plane, for example, where it is unable (or undesirable) to receive a voice call.

At 716, the system determines if the statuses of all of the UEs 102 identified at 604 have been checked (i.e., the current UE 102, UE 102(N) is greater than the total number of UEs 102, $UE_{TOT}$). If not, at 718, N is increased by one to check the next UE 102, UE 102(2). In this manner, the status of each UE 102 associated with the network identity can be checked prior to sending the message.

If, on the other hand, the status of all UEs 102 has been checked—i.e., UE 102(N)>$UE_{TOT}$—then, at 720, the message can be sent to each UE 102 in the message queue. In the manner, the message is sent only to those UEs 102 that are available. As discussed above, the availability of each UE 102 can depend on where the UE 102 is located, whether the UE 102 is roaming or not, the network to which the UE 102 is connected, or user preferences, among other things.

The system sending the message (regardless of type) only to available UEs 102 can prevent a number of issues. If the message is a voice call, for example, the system can prevent calls from being rejected by partially available or unavailable UEs 102, or by users manually rejecting calls. The system also prevents unnecessary traffic and buffering, for example, for messages sent to unavailable UEs 102. In this case, the message must be stored by the network until the UE 102 becomes available and then delivered. Using examples disclosed herein, the system can merely deliver the message to those UEs 102 that are currently available.

In some examples, the system can determine that all UEs 102 associated with a network identity are connected to the same network. This can occur, for example, when the method 800 attempts to send the network identity a message, and determines that all UEs 102 have the same IP address, for example. This can also occur simply because the UEs 102 are providing periodic status updates. In this situation, all UEs 102 may be unavailable for one or more types of messages.

Nonetheless, because all of the UEs 102 are associated with a single service account, the UEs 102 can be connected over the common network to enable users to IM one another and to see other users availability and activity via their respective UEs 102. Each UE 102 may be connected to an in-flight data service such as Gogo, for example; and thus, may have an IP address associated with that service. In this case, the system can enable a real-time connection between the UEs 102 using a common channel on the Gogo (or applicable) network.

Figure 8:
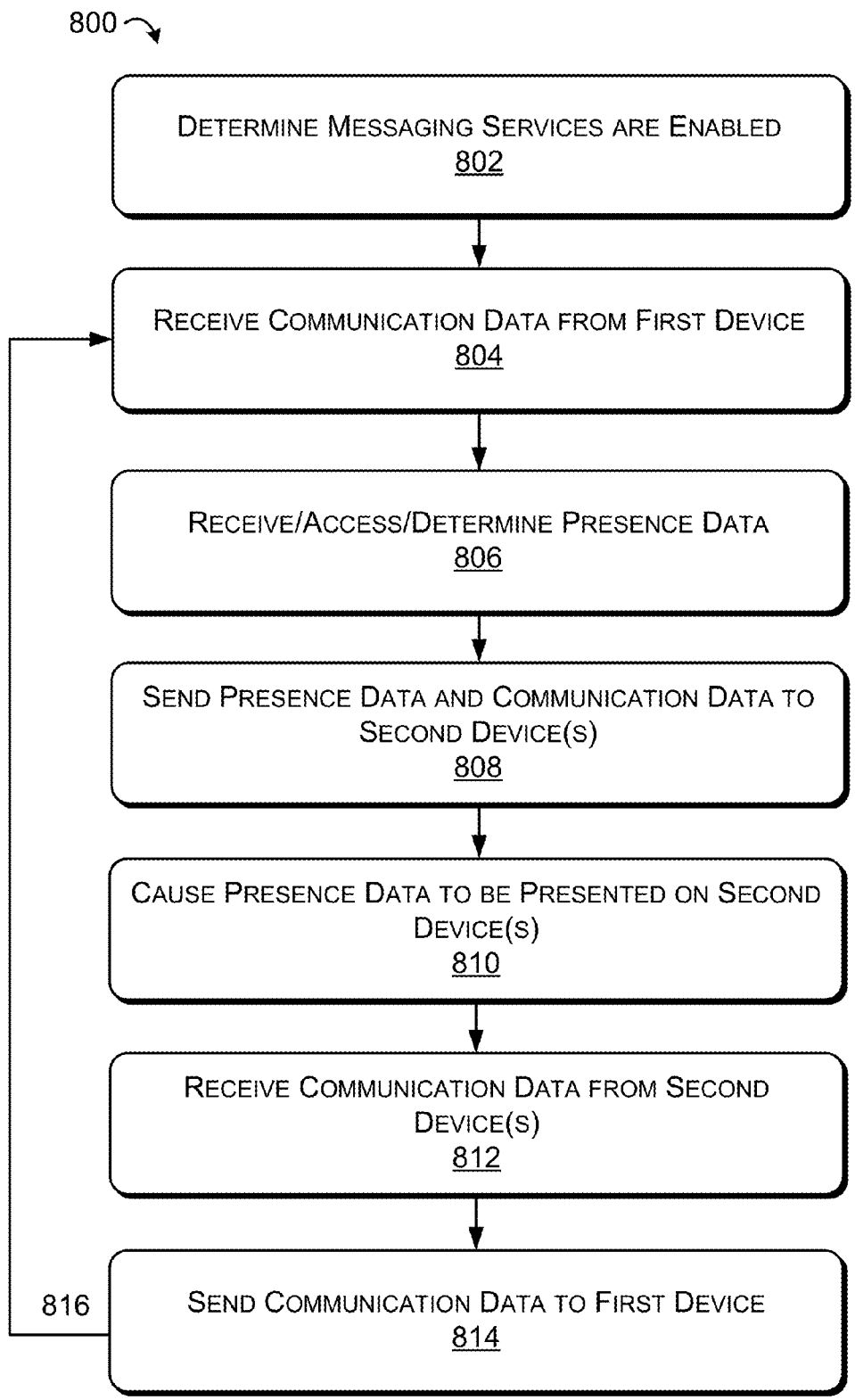
FIG. 8 illustrates an example process for determining and using messaging services on UEs assigned to a common service account and connected to a common network.

FIG. 8 is a flow diagram that illustrates an example process to cause social presence data associated with UEs 102 on a common network (e.g., in flight) to be presented to other UEs 102 associated with the same service account or network identity. In some examples, the UEs 102 can be on the same flight and connected to the same in-flight data service (e.g., Gogo). In other examples, the UEs 102 can be on different flights, but connected to the same in-flight service. In still other examples, the UEs 102 can be connected to the same WiFi, or other, network.

FIG. 8 can illustrate an example process 800 from the perspective of a service provider of the UE 102. As described above, it should be appreciated that more or fewer operations can be performed than shown in the figures and described herein. These operations can also be performed in parallel, or in a different order than those described herein. Some or all of these operations might also be performed by components other than those specifically identified.

Block 802 illustrates determining that messaging services are enabled. A first service provider (e.g., a cellular service provider associated with the service account) can receive a DNS query from a first UE 102—e.g., UE 102(1)—to initiate the enabling. The first service provider can forward the DNS query to a second service provider (e.g., an in-flight data service provider) to enable the messaging services. The second service provider can receive the DNS query from the first service provider to enable the messaging services.

Block 804 illustrates receiving communication data from the first user device, UE 102(1). As described above, components of the UE 102, such as the processor 212 in concert with the transceiver 218, can be configured to send and/or receive communication data to and/or from other UEs 102 (e.g., UE 102(2) thorough UE 102(N)) via the common network and/or the service providers. The communication data can include text messages, multimedia messages, voice messages represented by visual elements, etc. The common network, or a client on one or more of the UEs 102, can receive the data and can route the communication data to the intended recipients (e.g., user device(s) UE 102(2) through UE 102(N)).

Block 806 illustrates receiving/accessing/determining presence data. The common network, or a client on the UEs 102, can receive, access, and/or determine presence data associated with each UE 102. Each UE 102 can be displayed in a graphical user interface (GUI) for an application running on the UE 102. In this manner, each UE 102 (e.g., UE 102(1)) can see if other UEs 102 (e.g., UE 102(2)) are connected to the network, or "online," or connected to the common network, and if they are available. The UE's 102 availability can be set by the user (e.g., "do not disturb), by the application, or other factors.

Figure 9A:
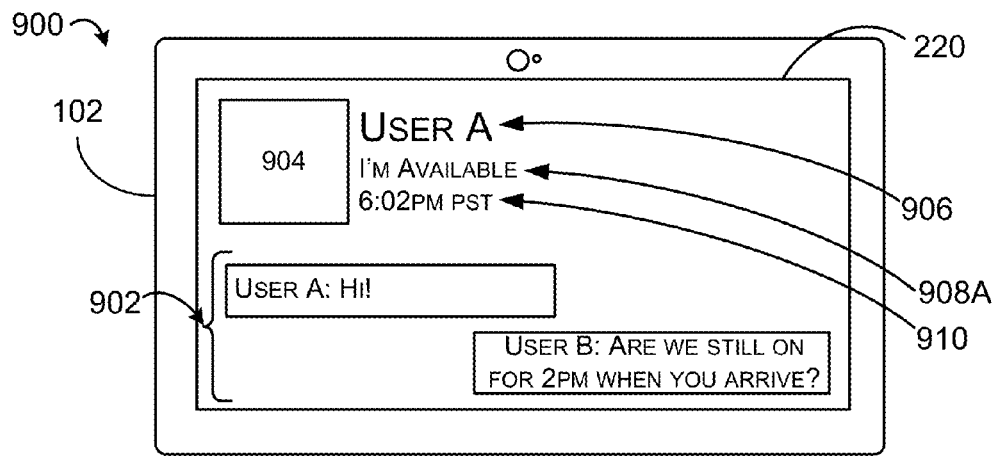
FIGS. 9A-9C depict examples of possible graphical user interfaces for use in conjunction with the messaging services of claim 8.
Figure 9B:
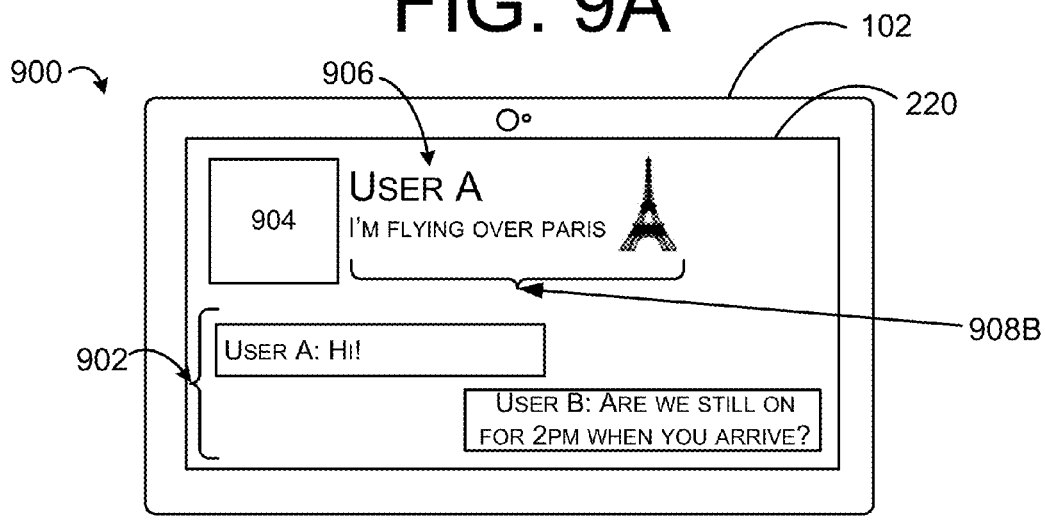
Figure 9C:
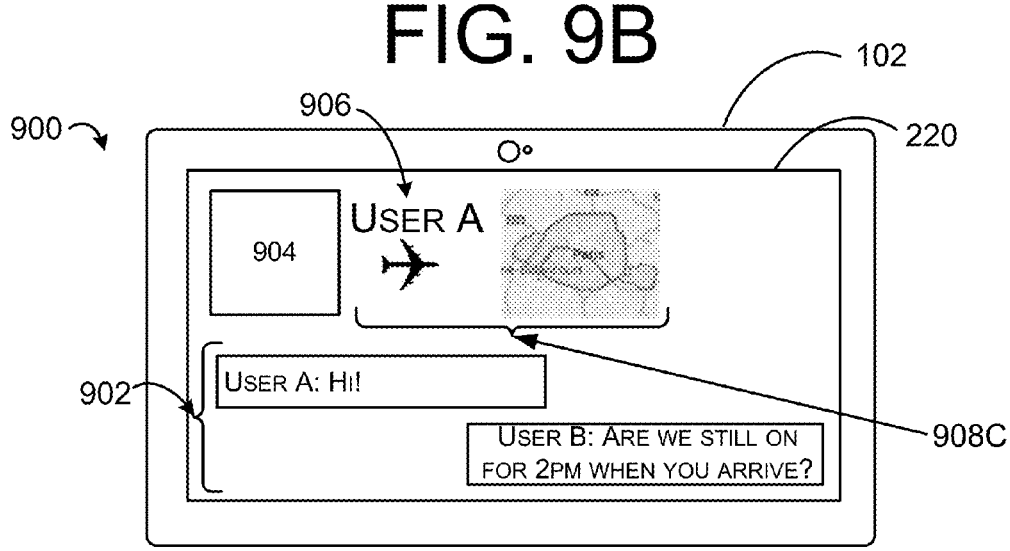

Block 808 illustrates, sending the communication data and the presence data to the at least one other UE 102 (e.g., UE 102(2)). The presence of each UE 102 can be updated periodically or in real-time. Block 810 illustrates causing the presence data to be presented on the at least one second user device (e.g., UE 102(2)). In some examples, the presence of each UE 102 can be displayed on the application regardless of whether the users are actually communicating. Examples of graphical and/or textual elements are shown in FIGS. 9A-9C and described below.

Block 812 illustrates receiving communication data from at least one UE 102 (e.g., UE 102(2)) at another UE 102 (e.g., UE 102(1)). In some examples, UE 102(2) can send communication data to UE 102(1) (and vice-versa) based at least in part on receiving communication data from the UE 102(1). The common network or a client on the UEs 102 can manage the exchange of communication data between UEs 102. The client can receive the communication data from UE 102(1), for example, and can route the communication data to the intended recipient (e.g., UE 102(2)).

Block 814 illustrates sending the communication data to UE 102(1). As described above, the common network and/or the client on the UEs 102 can route the communication data to the intended recipient (e.g., UE 102(1) in this case).

Based at least in part on sending the communication data to the first user device (e.g., UE 102(1)), the operations represented by blocks 804-814 can be repeated, as illustrated by line 816. That is, in some examples, the system can receive, access, and/or determine updated presence data based at least in part on sending the communication data and can send updated presence data along with, or in addition to, communication data.

FIGS. 9A-9C are schematic diagrams showing an example user interface 900 for presenting presence data associated with a UE 102 (e.g., UE 102(1)) in flight, or otherwise commonly connected, to be presented to other UEs 102 (e.g., UE 102(2)-UE 102(N)) associated with the same service account or network identity. As described above, the system can be configured to receive presence data and cause graphical and/or textual elements corresponding to the presence data to be presented on a display 220 of a corresponding UE 102. In at least one example, the system can send the presence data and data corresponding to graphical and/or textual elements to the client or application on the UE 102. The application can then render the graphical and/or textual elements such to cause the presence data to be presented on the display 220 of the UE 102.

Example user interface 900 illustrates a text message conversation 902 between users using two UEs 102 associated with the same service account (e.g., UE 102(1) and UE 102(2)). As described above, in additional and/or alternative examples, users can exchange multimedia messages and/or visual voicemails. Example user interface 900 can display graphical and/or textual elements representative of information associated with a one or more UEs 102, such as UE 102(1)-UE 102(N). In example user interface 900, the information can include a graphical element 904 representative of the user (e.g., a picture, emoji, or other representation), an alias 906 associated with a user (e.g., a screen name), and presence data (online, offline, available, unavailable, etc.).

FIG. 9A is schematic diagram showing the example user interface 900 where the presence data is represented by a textual element 908A that is presented on the display 220 of a UE 102. In FIG. 9A, the presence data 908 is availability data. However, location data and/or personal data can additionally and/or alternatively be presented. Additional examples of graphical and/or textual elements can be rendered on the screen 222 by the application or client. In at least one example, the presence data can be associated with a time stamp indicating a time that the system accessed, received, and/or determined the presence data. In some examples, the time stamp can be associated with a time zone, indicating which time zone the UE 102 was located in when the presence data was updated. Textual elements 910 corresponding to the time stamp and/or the time zone can be presented on the user interface 900. In some examples, users can add additional features to the user interface 900 such as favorite links to publish hypertext links of personal or favorite websites (e.g., blogs, social media pages etc.), aliases associated with other applications (e.g., social media applications, etc.), open text, etc.

FIG. 9B is schematic diagram showing the example user interface 900 where the presence data is represented by a combination of a textual element and a graphical element 908B that is presented on a display 220 of the UE 102. In FIG. 9B, the presence data is location data indicating that the UE 102 (and thus, the user) is flying over Paris, France. The graphical element is shown as a representation of the Eiffel Tower. In some examples, the graphical element can be a representative image and/or graphic that can be accessed from a database of graphical elements. In other examples, the graphical element can be a map representative of the location that can be access from a database of graphical elements, similar to the moving maps often displayed in planes en route. In addition, availability data and/or personal data can also be presented. Additionally and/or alternatively, a time stamp can be presented with the presence data and in some examples, the time stamp can be associated with a time zone, indicating which time zone the user (e.g., user A 108A) was located in when the presence data was updated, as described above. Additional examples of graphical and/or textual elements can be rendered by the system, application, or client.

FIG. 9C is schematic diagram showing the example user interface 900 where the presence data is represented by graphical elements 908C that are presented on a display 220 of the UE 102. In FIG. 9B, the presence data is location data indicating that the UE 102—and thus, the user—is currently in an aircraft. One of the graphical elements 908C is shown as a representation of an aircraft. In some examples, the graphical elements 908C can be a representative image and/or graphic that can be accessed from a database of graphical elements. In additional and/or alternative examples, the graphical elements 908C can be a map representative of the location that can be access from a database of graphical elements, as shown in FIG. 9C. In FIG. 9C, the UE 102 is located over Paris, France. In some examples, availability data and/or personal data can additionally and/or alternatively be presented. Additionally and/or alternatively, a time stamp can be presented with the presence data and in some examples, the time stamp can be associated with a time zone, indicating which time zone the UE 102 was located in when the presence data was updated, as described above. Additional examples of graphical and/or textual elements can be rendered by the system or by an application or client on the UE 102.

FIGS. 9A-9C are three examples of user interfaces that can be rendered for publishing social presence data. However, various other elements, content, layouts, etc. can also be used for publishing social presence data to users of messaging services associated with telecommunications service providers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, at a telecommunications network device, a message addressed to a network identity;
determining a type of the message received at the telecommunications network device;
identifying one or more contact addresses associated with the network identity;
determining, as one or more available user equipment (UEs), one or more UEs that are available to receive the message based at least in part on the type of the message received, each of the one or more available UEs being coupled to a telecommunication network based in part on user preferences and associated with at least one of the one or more contact addresses;
determining that at least one UE of the one or more available UEs is connected to a communications network via an internet protocol (IP) address associated with an in-flight data service;
determining that the at least one UE of the one or more available UEs is available to receive a first type of message; and
determining that the at least one UE of the one or more available UEs is unavailable to receive a second type of message;
adding the at least one UE to a message queue; and
sending the message to the at least one UE in the message queue.

2. The method of claim 1, wherein the first type of message is a text message or an instant message (IM).

3. The method of claim 1, wherein the second type of message is a voice call.

4. The method of claim 1, wherein determining the one or more available UEs comprises polling a UE of the one or more UEs that are available to receive the message to provide a status in real time.

5. A method comprising:
providing, with a first telecommunications network device, each of one or more user equipment (UEs) with a contact address, each contact address associated with a common network identity;
receiving, from the one or more UEs at the first telecommunications network device, one or more mappings, each mapping comprising:
one or more message types; and
one or more statuses associated with the one or more message types, wherein a first mapping of the one or more mappings includes providing at least one of a short messaging service (SMS) message or an instant message (IM) to a first UE of the one or more UEs in response to the first UE having a partially available status that indicates that the first UE is connected to a cellular network and roaming;
receiving, as a received message, at a second telecommunications network device, a message addressed to the common network identity;
determining, as a received message type, with the second telecommunications network device, a message type associated with the received message;
identifying, as one or more identified UEs, with the first telecommunications network device, one or more UEs associated with the common network identity;
determining, as one or more available UEs, with a third telecommunications network device and based, in part, on a status of the one or more statuses and the received message type, one or more identified UEs that are available to receive the received message, wherein each of the one or more identified UEs is coupled to a telecommunication network;

adding each of the one or more available UEs to a message queue associated with the message; and sending the message to the one or more available UEs in the message queue.

6. The method of claim 5, wherein the one or more message types include one or more of a voice call, short messaging service (SMS) message, and instant message (IM).

7. The method of claim 5, wherein a second mapping of the one or more mappings comprises:

providing any message type to a second UE of the one or more UEs when the second UE has an available status.

8. The method of claim 5, wherein determining the availability for the one or more UEs further comprises:

determining that a first set of the one or more identified UEs are available to receive the message; and determining that a second set of the one or more identified UEs are unavailable to receive the message.

9. The method of claim 8, wherein the second set of the one or more identified UEs are determined to be connected to an in-flight data network.

10. The method of claim 8, wherein the second set of the one or more identified UEs are determined to be connected to the cellular network and roaming.

11. A method comprising:

determining, with a first network telecommunications device of a first service provider, that three or more user equipment (UEs) associated with a common service account are connected to a common network associated with a second service provider, wherein the first service provider comprises a cellular service provider associated with the three or more UEs and the second service provider comprises an in-flight data provider;

sending a request from the first service provider to the second service provider to activate a messaging service for the three or more UEs;

receiving, via the common network, first communication data, at the first network telecommunications device, from a first UE of the three or more UEs;

receiving, via the common network, first presence data, at the first network telecommunications device, from the first UE; and providing, via the common network, at least the first communication data and the first presence data to a second UE and a third UE of the three or more UEs.

12. The method of claim 11, further comprising:

receiving, via the common network, second communication data, at the first network telecommunications device, from a second UE;

receiving, via the common network, second presence data, at the first network telecommunications device, from the second UE; and providing, via the common network, at least the second communication data and the second presence data to the first UE and the third UE.

13. The method of claim 11, wherein the first presence data includes a connection status and an availability.

14. The method of claim 11, wherein the first presence data includes a timestamp associated with a time the first presence data was received from the first UE at the first network telecommunications device.

15. The method of claim 11, wherein the first presence data includes a location of the first UE at a time the first presence data was received from the first UE at the first network telecommunications device.

* * * * *